AFTER WELDING BEFORE WELDING
TYPE "A"
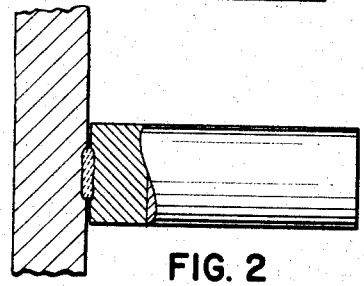
FIG. 2
FIG. 3
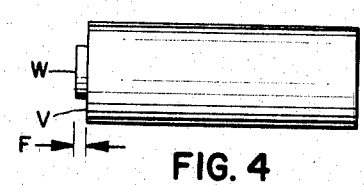
FIG. 4
TYPE "B"
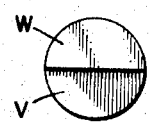
FIG. 6
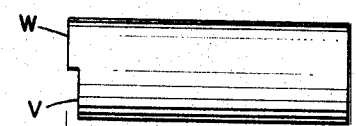
FIG. 7
FIG. 5
TYPE "C"
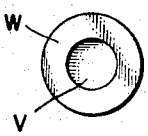
FIG. 9
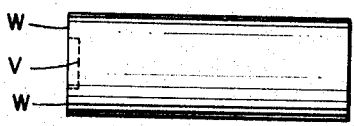
FIG. 10
FIG. 8

United States Patent Office 3,350,923
Patented Nov. 7, 1967

3,350,923
ULTRASONIC PULSE ECHO TESTING
METHOD AND APPARATUS
Newbold O. Cross, Berkeley Heights, N.J., assignor to Esso Research and Engineering Company, a corporation of Delaware
Filed Nov. 12, 1964, Ser. No. 410,399
8 Claims. (Cl. 73—67.8)

ABSTRACT OF THE DISCLOSURE

An ultrasonic pulse echo measuring system employing a delay line which is permanently attached to the specimen under test by the incomplete welding of the end surface of the delay line to the surface of the specimen. Incomplete welding retains echo capability of weld interface for producing a reference echo.

---

The present invention relates to a method and apparatus for the ultrasonic non-destructive testing of metallic articles. In particular, this invention concerns a method for attaching delay lines or sound conveying bars to metallic specimens and to the use of such delay lines in conjunction with measuring instruments that employ acoustic (or mechanical) vibrations in determining the thickness and integrity of metallic specimens.

Many industrial processes require high temperatures and high pressures for operation. The vessels employed in such processes must be periodically examined to assure safety of operation. The need for such examination is particularly great with those processes which employ moving solids within the reaction zone. Since most industrial processes of this nature are continuous, it is of vital importance that means be available for accurately determining the thickness of equipment walls at frequent intervals without disturbing the normal operation of such processes.

A number of highly efficient instruments utilizing various ultrasonic vibration measuring techniques have been developed for the periodic examination of closed vessels. Quartz, piezo-electric crystals are employed in such supersonic test apparatus as transmitting and receiving transducers. However, such piezo-electric crystals cannot be located adjacent to high temperature test pieces as they will not safely withstand the temperatures involved in the testing of materials maintained at temperatures above about 300° F.

It is recognized that various methods have been proposed to prevent the high temperature breakdown of the test transducers by interposing small blocks of steel on signal conveying bars between the transducer and the hot test piece. However, these methods, such as for example, U.S. 2,697,936, Cecil Farrow, inventor, are characterized by the use of liquid coupling mediums that serve to aid in the transmission of sound waves from the conveying bar to the test piece. Various problems have been experienced with the use of liquid coupling mediums in test work on vertical surfaces in that under these conditions efficient liquid to metal contact, necessary for good sound conduction, is difficult to maintain.

It is one object of this invention to provide a method for attaching a delay line to a metallic object to be ultrasonically tested that will permit the passage and return flow of sound waves without the necessity of utilizing liquid coupling mediums.

The present invention resides in the discovery of an improved method of attachment of delay lines or sound conveying bars to a test specimen to be ultrasonically tested. The method of attachment involves the use of a controlled limited fusion, resistance weld joint between the entire end surface of the metallic delay line and test specimen.

Alternatively, a small portion of the end surface of the delay line can be completely fused to the test piece leaving the remainder of the end portion of the delay line in contact with the test piece but not weldably fused thereto. The desired welds are characterized by possessing sufficient fusion between the test piece and delay line to permit the passage of ultrasonic waves and at the same time also exhibits sufficient reflecting characteristics (non-fusion) to permit the detection of multiple back reflections indicating the position of the front and back surfaces of the attached test specimen.

The attached delay line operates in conjunction with ultrasonic pulse echo instruments. The operational principle and design of the instruments are matters which are well known to the art and which are widely set forth in patent literature. With the pulse echo instruments, a transducer or surge crystal, is connected to the outer end of the delay line that is welded to the test specimen. The transducer is electrically excited to produce sound waves of from about 1 to 50 million cycles per second. The resulting ultrasound passes through the delay line and limited fusion weld or partially fused weld to the material being tested. The sound waves from the transducer then penetrates the metal being tested. Ultrasonic echoes are reflected back to the transducer from the test materials' front surface as indicated by the non-fused portion of the weld, rear surface and from interior defects. The instrumentation that is commonly used in the process industries generally employs a synchronizer which accurately times the return echoes and provides range markers which indicate the depth of the test piece.

The present invention is therefore concerned with improved methods for utilizing pulse echo flaw detection equipment for the periodic measurement of the thickness of vessel walls maintained at high temperatures and pressures without disturbing the normal operation or reaction taking place in such vessels.

This invention will be more easily understood by referring to the accompanying drawings, in which:

FIGURE 2 is a side view of one form of fused weld in accordance with the invention.

FIGURE 3 is an end view of the delay line of FIGURE 2 prior to welding.

FIGURE 4 is a side view of the delay line of FIGURE 3.

FIGURE 5 is a side view of another form of fused weld in accordance with the invention.

FIGURE 6 is an end view of the delay line of FIGURE 5 prior to welding.

FIGURE 7 is a side view of the delay line of FIGURE 6.

FIGURE 8 is a side view of another form of fused weld.

FIGURE 9 is an end view of the delay line of FIGURE 8 prior to welding.

FIGURE 10 is a side view of the delay line of FIGURE 9.

Figure 1:
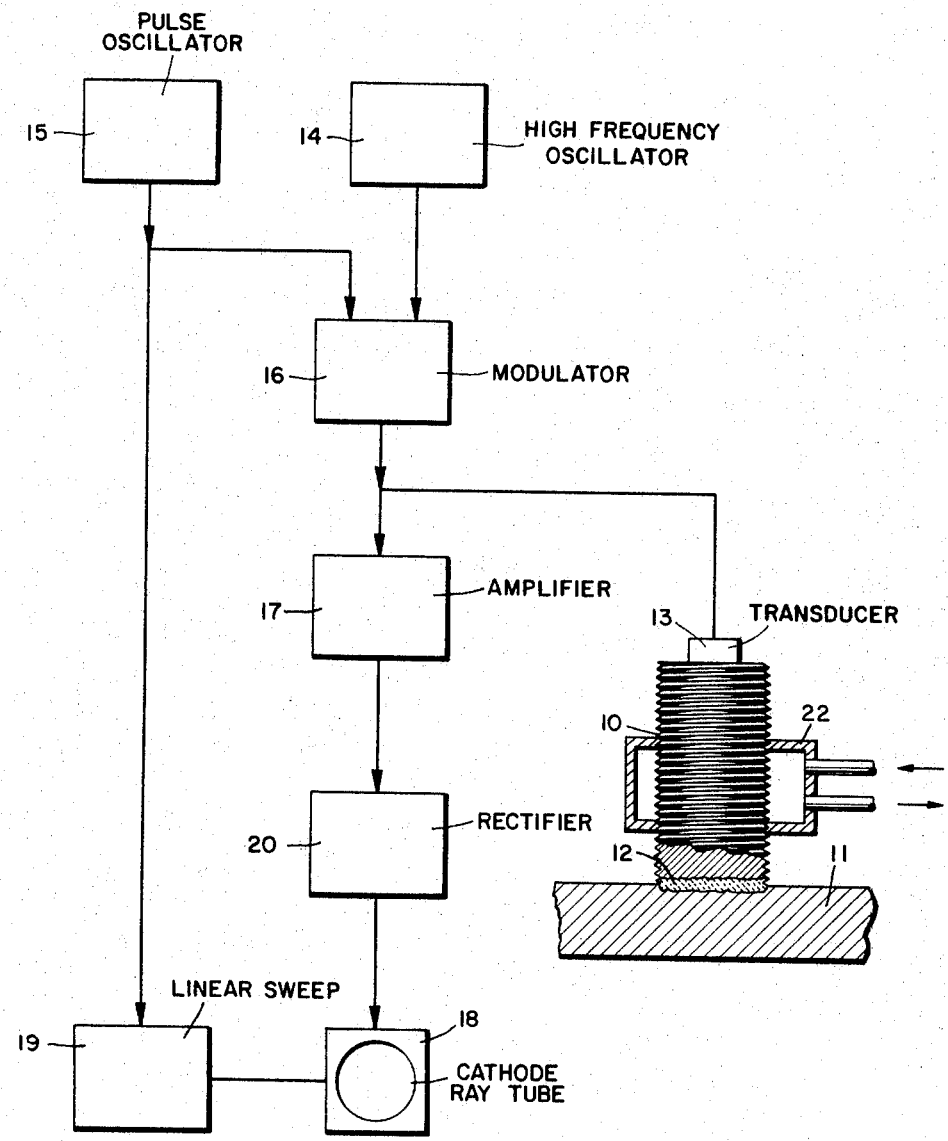
FIGURE 1 is a block diagram schematically illustrating an embodiment of the invention.

Referring now to FIGURE 1, the delay line 10 is attached to the test specimen 11 by employing an electrical resistance welding process, specifically referred to as the flash butt weld method.

Delay line 10 may be constructed of any suitable metallic member, rod or bar which can be welded to the test piece and which possesses sufficient sound conduction properties at the test frequency.

As depicted in FIGURE 1, the delay line 10 by the preferred embodiment is illustrated as having a helical groove cut into its external surface for its full length. The helical grooving serves to scatter and effectively dissipate sound waves which strike the side walls of the delay line which would ordinarily cause the back reflections received from the back and front surfaces of the test specimen to be obscured when viewed upon the oscilloscope or similar graphic viewing devices used in conjunction with the pulse echo flaw detection equipment.

Cooling means 22 may be provided for continuously cooling the delay line to prevent conduction of heat from the test piece through the delay line to the transducer. Water cooled jackets such as illustrated and/or cooling coils situated around the outer periphery of the delay line serve well in maintaining the temperature of the delay line at a reasonable levels.

The present invention is not limited to specific means for producing or detecting the test signals used to determine the thickness and integrity of the test specimen. However, satisfactory results have been obtained with the employment of piezo-electric quartz crystals both as the signal generating transducer and signal detecting transducer. A separate generator and receiver at or near the end of delay line 10 remote from test piece 11 may be employed. However, for the sake of simplicity of the drawings and the description of the present invention a single quartz crystal 13 is utilized as both the signal generator and the signal reflection detector.

Preferably the signals are produced in wave trains or a series of pulses in order to simplify the separation and identification of the transmitted signals and the signals reflected from the front and rear surfaces of the test piece 11. In determining the thickness and integrity of the test material, the return echoes which are representative of these qualities are reproduced on an oscilloscope screen.

A conventional electron tube apparatus is employed for producing the wave trains, for exciting the sending and receiving crystal 13, for amplifying the reflected signals received by the crystal 13, and for producing suitable deflections of the beam of the cathode ray oscilloscope to represent the return echoes. Since the electronic apparatus and cathode ray oscilloscope employed are well known devices to those skilled in the art, they have been represented schematically in FIGURE 1.

In the system shown by way of illustration and not by way of limitation, the pulse echo testing apparatus comprises in combination a high frequency oscillator 14 that determines the frequency of the supersonic test wave, a pulse oscillator 15 that controls the duration and interval between the test pulses, a modulator 16 actuated and controlled by high frequency oscillator 14 and pulse oscillator 15 for exciting the transducer 13 in accordance with the pulses or trains of waves desired to be transmitted to the delay line 10, an amplifier 17 for increasing the signal output of transducer 13 in amounts sufficient to cause deflection of the beam of a cathode ray oscilloscope represented by its screen 18, and a linear sweep circuit 19 suitably synchronized with the generated wave trains or pulses by a coupling to the pulse oscillator 15 for spreading the oscilloscope trace horizontally on the oscilloscope screen 18. If desired, a rectifier 20 may be inserted into the circuit between the amplifier 17 and the vertical deflection circuit of the oscilloscope.

In operation, the first end of a metallic delay line is welded to a point of interest on the surface of the material to be tested. A transducer is brought into signal transmitting and receiving relationship with the second or opposite end of the delay line. Electrical impulses are transmitted to the crystal transducer causing the transducer to be set in vibration in wave trains or pulses corresponding to the electrical wave trains applied thereto. The pulse train from the transducer passes through the delay line to the partially fused weld at the interface between the first end of the delay line and the test specimen.

A portion of the pulse train passing through the delay line is reflected back to the transducer by the non-fused portion of the delay line-test specimen interface while a portion of the wave train passes through the fused portion of the weld into the test specimen and are reflected back to the transducer after being reflected by the back wall of the test specimen. The resulting reflections both from the non-fused portion of the weld and the back wall of the test specimen are then analyzed to determine the thickness and integrity of the metal specimen.

As stated previously, the present invention is not limited to the use of any particular type of pulse echo testing equipment. The pulse echo testing equipment may be of any suitable type such as for example the Sperry Attenuation Comparator, Style 56A001, the Sperry "Reflectoscope," Type UM–700, the Branson "Sonoray" Model 5 pulse echo flaw detector, and the Curtiss-Wright "Immerscope" pulse echo flaw detector, Model PT–1001.

To produce the desired uniform, limited fusion weld having from 5 to 50% or more preferably 5 to 30% fusion over the entire interface 12 between the delay line 10 and the test specimen 11, it is necessary to diminish the normal flash butt welding current to approximately 40 to 60% of the optimum value used to obtain a 100% fused joint. The current values necessary to obtain a 100% fused joint between various types of metallic materials can be obtained from the "Tool Engineers Handbook," American Society of Tool Engineers, McGraw-Hill, 1949, page 1141.

Obtaining a uniform limited fusion weld having from 5 to 50% fusion over the entire delay line-test piece interface is a critical feature of the instant invention. It has been found that if the test piece and delay line are not maintained in a planer and mutually parallel position to each other, the resulting weld will not be of a uniform quality. As a result the sound waves passing through the delay line from the piezo-electric crystal are scattered when passing through the interface causing the resulting return peaks or echoes from the test piece to vary from their usual decreasingly exponential quality. Accordingly, it has been found that if the degree of fusion between the test piece and delay line exceeds the desired 50% value, there will be no return echo indicating the point at which the delay line ends and the test piece begins.

Turning now to FIGURES 2–10, weld types A, B, and C illustrate varieties of partially fused welds wherein from about 5 to 50% of the delay lines' end surface is completely fused to the test piece and the remainder of the end surface of the delay line is in contact with the test piece but not connected thereto.

To form the desired partially fused welds, at least 50% of one of the end surfaces of the delay line is machined down an amount F leaving an amount of surface area W protruding from the end surface of the delay line.

The prepared stud is then welded to the test piece with the welding currents used being sufficient to completely fuse area W to the test piece. The welding currents necessary to fuse particular materials can be found in the current literature such as the "Tool Engineers Handbook," McGraw-Hill, 1949. During the welding operation, distance F will be consumed when the stud (delay line) is fused to the test material. After fusing, space F will close up and surface V will be flush with the outside surface of the test material.

Distance F necessary for any type of welding operation, can readily be determined from the literature or through simple experimentation. For example, F values ranging from 0.005 to 0.010 inch are usually sufficient to prevent the delay line from being completely fused to the test piece.

The partially fused weld has the advantage of being more rigidly connected to the test piece than a limited fusion weld. Additionally, a cleaner, stronger echo will be received from the unfused stud surface V than from the surface of a limited fusion weld.

The following example illustrates the sound-carrying characteristics of limited fusion welds having various degrees of fusion between the delay line and test piece.

EXAMPLE 1

| Percent Fusion | Percent of Current Requirements for a 100% Fused Weld | Interface Echo Received at Normal Test Frequency |
|---|---|---|
| 5-10 | 40 | Yes |
| 40-50 | 60 | Yes |
| 50-60 | 75 | No |

Resort may be had to various modifications and variations of the invention without departing from the spirit of the discovery or the scope of the appended claims.

What is claimed is:

1. An ultrasonic testing apparatus for use in the ultrasonic testing of a metallic article which comprises in combination, a metallic member having first and second ends, a fused butt weld joint connecting the first end of said metallic member in contact with said metallic article, said first end being from 5 to 50% weldably fused to said metallic article whereby the interface between the first end and said metallic article retains its echo producing capacity, and a signal transducer means mounted at the second end of said metallic member, pulse echo generating and indicating means, means connecting said transducer to said pulse echo generating and indicating means.

2. The apparatus of claim 1 wherein cooling means are provided said metallic member to continuously cool said metallic member to prevent the excessive transfer of heat through said member.

3. A method for determining the thickness and integrity of metallic articles which comprises electrically welding one end of a metallic delay line to said metallic article to be tested, the current requirements for said weld being from about 40 to 60% of the current requirements for a 100% fused weld between said delay line and metallic article, transmitting supersonic signals in pulses from a transducer located at the opposite end of the delay line through said delay line to said metallic article, and producing a graphic signal representative of the supersonic pulses that are reflected back to said transducer from the welded end of said delay line and the back surface of said metallic article.

4. The method of claim 3 including continuously cooling said delay line to prevent the excessive transfer of heat to said transducer.

5. A method for determining the thickness and integrity of metallic articles which comprises welding not more than 50% of the surface area of one end of a metallic delay line to said metallic article to be tested, the remaining surface area of said welded delay line being in contact with said metallic article, transmitting supersonic signals in pulses from a transducer located at the opposite end of the delay line through said delay line to said metallic article, and producing a graphic signal representative of the supersonic pulses that are reflected back to said transducer from the welded end of said delay line and the back surface of said metallic article.

6. The method of claim 5 including continuously cooling said delay line to prevent the excessive transfer of heat to said transducer.

7. An ultrasonic testing apparatus for use in the ultrasonic testing of a metallic article which comprises, in combination, a metallic member having first and second ends, said first end having a raised surface portion comprising from 5 to 50% of the total area of said first end, a weld joint connecting the raised surface portion of the first end of said metallic member in substantially complete fused contact with said metallic article, and a signal transducer means mounted at the second end of said metallic member, pulse echo generating and indicating means, means connecting said transducer to said pulse echo generating and indicating means.

8. The apparatus of claim 7 wherein cooling means are provided for said metallic member to continuously cool said metallic member to prevent the excessive transfer of heat through said member.

References Cited

UNITED STATES PATENTS

| 2,105,479 | 1/1938 | Hayes | 73—67.8 |
| 2,697,936 | 12/1954 | Farrow | 73—67.9 |
| 3,242,723 | 3/1966 | Evans | 73—67.9 |

JAMES J. GILL, *Primary Examiner.*

JOHN P. BEAUCHAMP, *Assistant Examiner.*